United States Patent
Ashminov et al.

(10) Patent No.: US 10,181,045 B1
(45) Date of Patent: Jan. 15, 2019

(54) AUTOMATED EMAIL MESSAGE AND DOCUMENT SHREDDING SYSTEM

(71) Applicant: Hologic Inc., Bedford, MA (US)

(72) Inventors: Constantine Ashminov, Boston, MA (US); Jay Stein, Boston, MA (US)

(73) Assignee: Hologic, Inc., Marlborough, MA (US)

( * ) Notice: Subject to any disclaimer, the term of this patent is extended or adjusted under 35 U.S.C. 154(b) by 56 days.

(21) Appl. No.: 14/808,595

(22) Filed: Jul. 24, 2015

(51) Int. Cl.
*G06F 21/62* (2013.01)
*H04L 29/06* (2006.01)

(52) U.S. Cl.
CPC ...... *G06F 21/6209* (2013.01); *H04L 63/0435* (2013.01); *H04L 63/067* (2013.01)

(58) Field of Classification Search
CPC .................................................. G06F 21/6209
USPC ......................................................... 713/164
See application file for complete search history.

(56) References Cited

U.S. PATENT DOCUMENTS

| | | | | |
|---|---|---|---|---|
| 7,114,007 B2* | 9/2006 | Sasaki | ................. | H04L 29/06 709/203 |
| 7,191,219 B2 | 3/2007 | Udell et al. | | |
| 7,356,564 B2 | 4/2008 | Hartselle et al. | | |
| 7,916,863 B2* | 3/2011 | Simske | ................. | G06F 21/608 380/55 |
| 8,601,583 B1* | 12/2013 | Chandrasekhar | ....... | G06F 21/54 726/24 |
| 8,661,254 B1* | 2/2014 | Sama | ................. | H04L 9/3215 380/247 |
| 8,738,707 B2* | 5/2014 | Allen | ................. | G06Q 10/107 709/206 |
| 9,053,297 B1* | 6/2015 | Fitch | ................. | G06F 21/34 |
| 2005/0222932 A1* | 10/2005 | Murashita | ............. | G06Q 20/12 705/35 |
| 2007/0162753 A1* | 7/2007 | Nakano | ................. | H04L 9/0844 713/171 |
| 2008/0260161 A1* | 10/2008 | Yokota | ................. | G06F 21/10 380/278 |
| 2010/0267403 A1* | 10/2010 | Lungaro | ............. | H04L 67/2847 455/466 |
| 2017/0014720 A1* | 1/2017 | Gondai | ................. | A63F 13/67 |

* cited by examiner

*Primary Examiner* — Khalil Naghdali

(57) ABSTRACT

Illustrative implementations are described for an automated email message and document shredding system. The implementations provide for generating electronic content and associating the content with a condition upon which the content may self-terminate. Based on the condition, a security context may be determined for the content. The security context determination facilitates the association of a security key corresponding to the security context associated with the content. The security key may be applied to the content to generate encrypted content. A notification of the security key used to encrypt the content, a notification of the condition upon which the content will self-terminate and the encrypted content may then be transmitted to a recipient.

17 Claims, 9 Drawing Sheets

AUTOMATED EMAIL MESSAGE AND DOCUMENT SHREDDING SYSTEM

BACKGROUND

In the online world, transmitting and securing sensitive data may be a difficult task. For example, existing automated systems control the routing, transmission and storage of the message content, thus imposing the installation of new protocols and constructs on the underlying system. Further, existing systems cannot provide wiretap safety without possessing complete control of the routing networks. Additionally, existing systems require the presence of a trusted third-party entity between the communicating clients.

It is with respect to these and other general considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

The present disclosure provides methods, systems, and computer products for providing an automated email message and document shredding system. Specifically, one or more embodiments provide for generating electronic content and associating the content with a condition upon which the content may self-terminate. Self-terminating content, as used herein, is content that may be become inaccessible and/or unusable, or may be deleted and/or removed upon the satisfaction of one or more conditions. Self-terminating content may include electronic content, email content, web content or other forms of exchangeable content. Based on the condition, a security context may be determined for the content. The security context determination facilitates the association of a security key corresponding to the security context associated with the content. The security key may be applied to the content to generate encrypted content. A notification of the security key used to encrypt the content, a notification of the condition upon which the content will self-terminate and the encrypted content may then be transmitted to a recipient.

In such embodiments, upon receiving the notification of the security key, the notification of the condition and the encrypted content, a security key to decrypt the encrypted content may be determined. The determination may depend at least in part on the received notification of the condition. When the recipient attempts to access the received content, a determination may be made as to whether the condition has been satisfied. In some embodiments, this determination may additionally be made at alternate times. For example, the determination may be made if the sender attempts to alter the termination time associated with the content. If it is determined that the condition has been satisfied, the security key used to decrypt the content is deleted and the encrypted content may be rendered permanently unreadable. If it is determined that the condition has not been satisfied, the security key may be used to decrypt the encrypted content and the content may be rendered readable.

In another embodiment, email content is generated and associated with a condition upon which the email content will self-terminate. Based on the condition, a security context may be applied to the email content. The security context determination facilitates the association of a security key corresponding to the security context associated with the email content. The security key may be applied to the email content to generate encrypted content. In embodiments, a notification of the security key used to encrypt the content, a notification of the condition upon which the content will self-terminate and/or the encrypted content may then be transmitted to a recipient as metadata associated with the email content.

In another embodiment, web content may be generated and associated with a condition upon which the web content will self-terminate. Based on the condition, a security context may be applied to the web content. The security context determination facilitates the association of a security key corresponding to the security context associated with the web content. The security key may be applied to the web content to generate encrypted content. In embodiments, the encrypted content, along with an indication of the security key used to encrypt the content and an indication of the condition upon which the content will self-terminate, may then be transmitted to a third party server.

These and other features and advantages, which character the present non-limiting embodiments, will be apparent from a reading of the following detailed description and a review of the associated drawings. It is to be understood that both the foregoing general description and the following detailed description are explanatory only and are not restrictive of the non-limiting embodiments as claimed.

In one aspect, the technology relates to a method of sending self-terminating content, including: generating content; associating a condition with the content, wherein the content self-terminates upon satisfaction of the condition; determining a security context, wherein the determination of the security context is based at least in part on the condition; based on the determined security context, determining a security key to associate with the content; applying the security key to the content to generate encrypted content; and based on the condition, sending notification of the security key and notification of the condition to a recipient of the encrypted content. In an embodiment, generating content further includes identifying one or more sections of the content as self-terminating. In another embodiment, the one or more sections of the content include at least one of text, an image, and an audio file. In yet another embodiment, the condition includes at least one of the elapse of a time period, the access of the content, the activation of the content, a recipient-triggered event and an event triggered by a sender of the content. In still another embodiment, applying the security key to the content includes using One-Time Pad (OTP) encryption.

In another embodiment of the above aspect, using OTP encryption includes at least transmitting the security key to a computing device sending the self-terminating content and a computing device receiving the self-terminating content prior to sending the self-terminating content. In an embodiment using One-Time Pad (OTP) encryption further includes transmitting the security key in a point-to-point transmission. In another embodiment, the notification of the security key and the notification of the condition are sent to the recipient over a peer-to-peer network.

In another aspect, the technology relates to a method of receiving self-terminating content, including: receiving encrypted content, wherein a condition is associated with the encrypted content; determining a security key to decrypt the encrypted content; determining whether the condition has been satisfied, wherein termination of the content is based upon the satisfaction of the condition; when the condition has been satisfied, deleting the security key; and when the condition has not been satisfied, decrypting the encrypted content with the security key. In an embodiment, the encrypted content includes at least one of: the self-terminating content; a notification of the security key associated with the encrypted content; and a notification of the condition associated with the encrypted content. In another embodiment, determining the security key includes parsing the notification of the security key. In yet another embodiment, determining whether the condition has been satisfied includes parsing the notification of the condition associated with the self-terminating content. In still another embodiment, deleting the security key includes removing the security key from at least one of a computing device used to send the encrypted content and a computing device used to receive of the encrypted content.

In another embodiment of the above aspect, deleting the security key includes disabling the security key on at least one of the computing device used to send the encrypted content and a computing device used to receive of the encrypted content. In an embodiment, receiving the encrypted content includes receiving the encrypted content over a peer-to-peer connection.

In another aspect, the technology relates to a computer-readable storage medium encoding computer executable instructions which, when executed by at least one processor, performs a method for sending self-terminating content, the method including: generating content; associating a condition with the content, wherein the content self-terminates upon satisfaction of the condition; determining a security context, wherein the determination of the security context is based at least in part on the condition; based on the determined security context, determining a security key to associate with the content; applying the security key to the content to generate encrypted content; and based on the condition, sending notification of the security key and notification of the condition to a recipient of the encrypted content. In an embodiment, generating content further includes identifying one or more sections of the content as self-terminating. In another embodiment, the one or more sections of the content include at least one of: text; an image; and an audio file. In yet another embodiment, the condition includes at least one of: elapsing a time period; accessing of the content; activation of the content; a recipient-triggered event; and an event triggered by a sender of the content. In still another embodiment, applying the security key to the content includes using One-Time Pad (OTP) encryption.

In another aspect, the technology relates to a method of sending self-terminating email content, including: generating email content, the email content including metadata; associating a condition with the email content, wherein the email content self-terminates upon satisfaction of the condition; determining a security context, wherein the determination of the security context is based at least in part on the condition; based on the determined security context, determining a security key to associate with the email content; applying the security key to the email content to generate encrypted email content; and sending a notification of the security key and a notification of the condition to a recipient of the encrypted email content, wherein the notification of the security key and the notification of the condition are provided in the metadata. In an embodiment, generating email content further includes identifying one or more sections of the email content as self-terminating. In another embodiment, the one or more sections of the email content include at least one of text, an image, and an audio file. In yet another embodiment, the condition includes at least one of the elapse of a time period, the access of the email content, the activation of the email content, a recipient-triggered event, and an event triggered by a sender of the email content. In still another embodiment, applying the security key to the email content includes using One-Time Pad (OTP) encryption.

In another embodiment of the above aspect, using One-Time Pad (OTP) encryption includes at least transmitting the security key to a computing device sending the self-terminating email content and a computing device receiving the self-terminating email content prior to sending the self-terminating email content. In an embodiment, using One-Time Pad (OTP) encryption further includes transmitting the security key in a point-to-point transmission. In another embodiment, the notification of the security key and the notification of the condition are transmitted to an intermediate server.

In another aspect, the technology relates to a system for sending self-terminating email content, including: a computing device, including: a processor; and memory coupled to the processor, the memory having computer executable instructions that, when executed by the processor performs a method including: generating email content using MAPI, wherein the email content includes metadata; determining a condition which causes the email content to terminate; determining a security context, wherein the determination of the security context is based at least in part on the condition; based on the determined security context, determining a security key to associate with the email content; applying the security key to the email content to generate encrypted email content; and based on the condition, sending notification of the security key and notification of the condition to a recipient of the encrypted email content, wherein the notification of the security key and the notification of the condition are provided in the metadata. In an embodiment, generating email content further includes identifying one or more sections of the email content as self-terminating. In another embodiment, the one or more sections of the email content include at least one of text, an image, and an audio file. In yet another embodiment, the condition includes at least one of the elapse of a time period, the access of the email content, the activation of the email content, a recipient-triggered event, and an event triggered by a sender of the email content. In still another embodiment, applying the security key to the email content includes using One-Time Pad (OTP) encryption.

In another aspect, the technology relates to a computer-readable storage medium encoding computer executable instructions which, when executed by at least one processor, performs a method for sending self-terminating email content, including: generating email content, the email content including metadata; associating a condition with the email content, wherein the email content self-terminates upon satisfaction of the condition; determining a security context, wherein the determination of the security context is based at least in part on the condition; based on the determined security context, determining a security key to associate with the email content; applying the security key to the content to generate encrypted email content; and based on the condition, sending notification of the security key and notification of the condition to a recipient of the encrypted email content, wherein the notification of the security key and the notification of the condition are provided in the metadata. In an embodiment, generating email content further includes identifying one or more sections of the email content as self-terminating. In another embodiment, the one or more sections of the email content include at least one of text, an image, and an audio file. In yet another embodiment, the condition includes at least one of the elapse of a time period, the access of the email content, the activation of the email content, a recipient-triggered event, and an event triggered by a sender of the email content. In still another embodiment, applying the security key to the email content includes using One-Time Pad (OTP) encryption.

In another embodiment of the above aspect, using One-Time Pad (OTP) encryption includes at least transmitting the security key to a computing device sending the self-terminating email content and a computing device receiving the self-terminating email content prior to sending the self-terminating email content. In an embodiment, using One-Time Pad (OTP) encryption further includes transmitting the security key in a point-to-point transmission.

In another aspect, the technology relates to a method of sending self-terminating web content, including: generating web content; determining a condition which causes the web content to terminate; determining a security context, wherein the determination of the security context is based at least in part on the condition; based on the determined security context, determining a security key to associate with the web content; applying the security key to the web content to generate encrypted web content; and sending the encrypted web content to a third party server, wherein the encrypted web content includes an indication of the security key and an indication of the condition. In an embodiment, generating web content further includes identifying one or more sections of the web content as self-terminating. In another embodiment, one or more sections of the web content include at least one of text, an image, and an audio file. In yet another embodiment, the condition includes at least one of the elapse of a time period, the access of the web content, the activation of the web content, a recipient-triggered event, and an event triggered by a sender of the web content. In still another embodiment, applying the security key to the web content includes using One-Time Pad (OTP) encryption.

In another embodiment of the above aspect, using One-Time Pad (OTP) encryption includes at least transmitting the security key to a computing device sending the self-terminating web content and a computing device receiving the self-terminating web content prior to sending the self-terminating web content. In an embodiment, the encrypted web content further includes a bit sequence. In another embodiment, the bit sequence indicates at least one of: the encrypted web content is encrypted, the encrypted web content includes an indication of the security key and the encrypted web content includes an indication of the security key and an indication of the condition includes an indication of the condition.

In another aspect, the technology relates to a method of receiving self-terminating web content, including: accessing encrypted web content, wherein a condition is associated with the encrypted web content; determining a security key to decrypt the encrypted web content; determining whether the condition has been satisfied, wherein termination of the web content is based upon the satisfaction of the condition; when the condition has been satisfied, deleting the security key; and when the condition has not been satisfied, decrypting the encrypted content with the security key. In an embodiment, the encrypted web content includes at least of an indication of the security key associated with the encrypted web content and an indication of the condition associated with the self-terminating web content. In another embodiment, determining a security key includes parsing the indication of the security key. In yet another embodiment, determining whether the condition has been satisfied includes parsing the notification of the condition associated with the self-terminating web content. In still another embodiment, deleting the security key includes removing the security key from at least one of a computing device used to send the encrypted web content and a computing device used to receive of the encrypted web content.

In another embodiment of the above aspect, deleting the security key includes disabling the security key on at least one of the computing device used to send the encrypted web content and a computing device used to receive of the encrypted web content. In an embodiment, receiving the encrypted web content includes a sequence of bits. In another embodiment, the sequence of bits indicates that the encrypted web content is to be decrypted.

In another aspect, the technology relates to a computer-readable storage medium encoding computer executable instructions which, when executed by at least one processor, performs a method for receiving self-terminating web content, including: accessing encrypted web content, wherein a condition is associated with the encrypted web content; determining a security key to decrypt the encrypted web content; determining whether the condition has been satisfied, wherein termination of the web content is based upon the satisfaction of the condition; when the condition has been satisfied, deleting the security key; and when the condition has not been satisfied, decrypting the encrypted content with the security key. In an embodiment, the encrypted web content includes at least of an indication of the security key associated with the encrypted web content and an indication of the condition associated with the self-terminating web content. In another embodiment, deleting the security key includes removing the security key from at least one of a computing device used to send the encrypted web content and a computing device used to receive of the encrypted web content. In yet another embodiment, deleting the security key includes disabling the security key on at least one of the computing device used to send the encrypted web content and a computing device used to receive of the encrypted web content.

BRIEF DESCRIPTION OF THE DRAWINGS

Non-limiting and non-exhaustive embodiments are described with reference to the following Figures in which.

DETAILED DESCRIPTION

Figure 1:
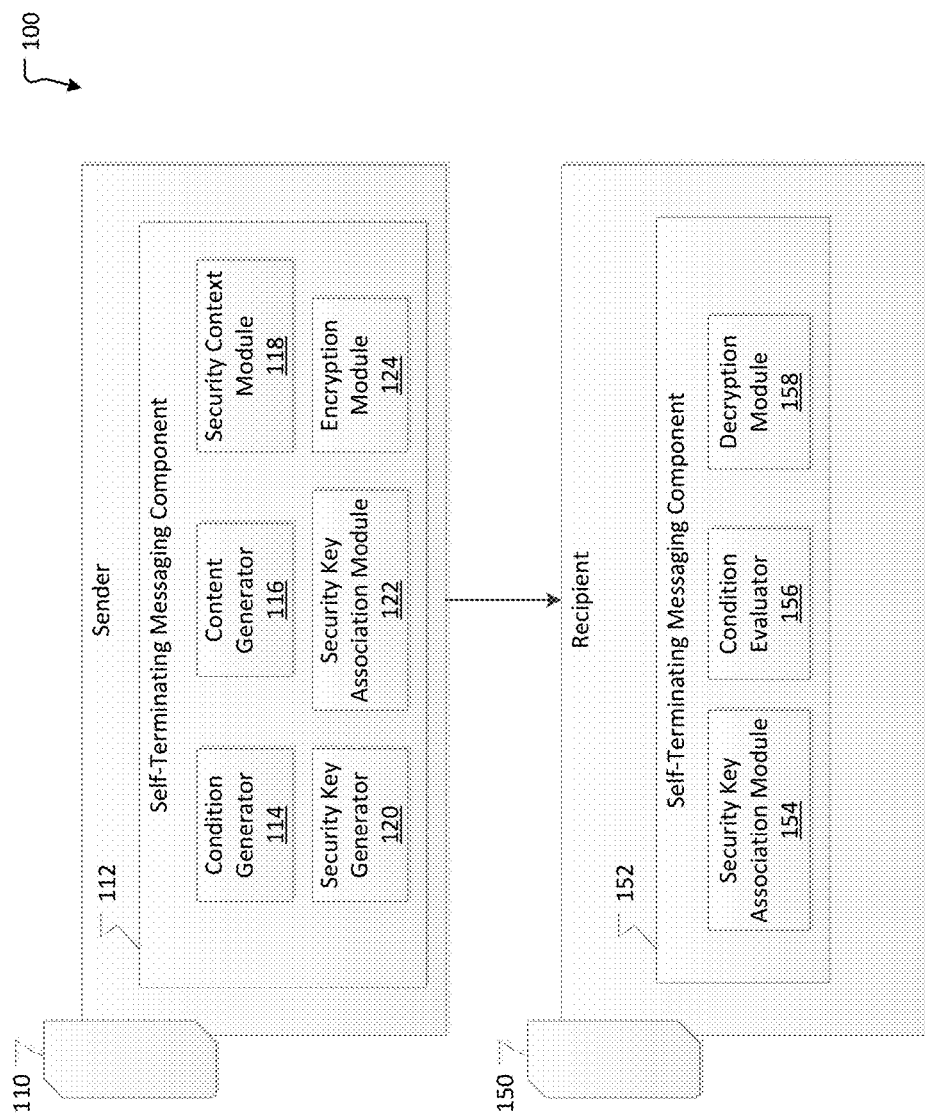
FIG. 1 illustrates a peer-to-peer system for exchanging self-terminating electronic content according to one or more embodiments of the present disclosure.

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The present disclosure provides methods, systems, and computer products for providing an automated email message and document shredding system. Specifically, one or more embodiments provide for generating electronic content and associating the content with a condition upon which the content may self-terminate. Based on the condition, a security context may be determined for the content. The security context determination facilitates the association of a security key corresponding to the security context associated with the content. The security key may be applied to the content to generate encrypted content. A notification of the security key used to encrypt the content, a notification of the condition upon which the content will self-terminate and the encrypted content may then be transmitted to a recipient.

In such embodiments, upon receiving the notification of the security key, the notification of the condition and the encrypted content, a security key to decrypt the encrypted content may be determined. The determination may depend at least in part on the received notification of the condition. When the recipient attempts to the access the received content, a determination may be made as to whether the condition has been satisfied. If it is determined that the condition has been satisfied, the security key used to decrypt the content is deleted and the encrypted content may be rendered permanently unreadable. If it is determined that the condition has not been satisfied, the security key may be used to decrypt the encrypted content and the content may be rendered readable.

In another embodiment, email content is generated and associated with a condition upon which the email content will self-terminate. Based on the condition, a security context may be applied to the email content. The security context determination facilitates the association of a security key corresponding to the security context associated with the email content. The security key may be applied to the email content to generate encrypted content. In embodiments, a notification of the security key used to encrypt the content, a notification of the condition upon which the content will self-terminate and/or the encrypted content may then be transmitted to a recipient as metadata associated with the email content. In embodiments, self-terminating messaging component may function on presently-deployed general purpose inter-network mail routing facilities.

In such an embodiment, upon accessing the notification of the security key used to encrypt the content and the notification of the condition associated with the encrypted email content, a security key to decrypt the encrypted email content may be determined. The determination may depend at least in part on the received notification of the condition. When the recipient attempts to the access the email content, a determination may be made as to whether the condition has been satisfied. If is determined that the condition has been satisfied, the security key used to decrypt the email content is deleted and the encrypted email content may be rendered permanently unreadable. If is determined that the condition has not been satisfied, the security key may be used to decrypt the encrypted email content and the content may be rendered readable In another embodiment, web content may be generated and associated with a condition upon which the web content will self-terminate. Based on the condition, a security context may be applied to the web content. The security context determination facilitates the association of a security key corresponding to the security context associated with the web content. The security key may be applied to the web content to generate encrypted content. In embodiments, the encrypted content, along with an indication of the security key used to encrypt the content and an indication of the condition upon which the content will self-terminate, may then be transmitted to a third party server.

In such an embodiment, upon accessing the indication of the security key used to encrypt the content and the indication of the condition upon which the content will self-terminate, a security key to decrypt the encrypted web content may be determined. The determination may depend at least in part on the received indication of the condition. When the recipient attempts to the access the web content, a determination may be made as to whether the condition has been satisfied. If is determined that the condition has been satisfied, the security key used to decrypt the web content is deleted and the encrypted web content may be rendered permanently unreadable. If is determined that the condition has not been satisfied, the security key may be used to decrypt the encrypted web content and the content may be rendered readable.

FIG. 1 illustrates a system 100 for exchanging self-terminating electronic content over a peer-to-peer network, an intranet network, and/or a distributed computing network, such as the Internet. As shown in FIG. 1, the system 100 may include a sender computing device 110 and a recipient computing device 150. In certain embodiments, the sender computing device 110 and the recipient computing device 150 may establish a communication session with each other over the Internet or via some other form of communication. The communication session between the sender computing device 110 and the recipient computing device 150 may be a peer-to-peer connection. In other embodiments, a third party computing device may establish the communication between the sender computing device 110 and the recipient computing device 150 over the Internet or via some other form of communication.

Although FIG. 1 shows only one sender computing device and one recipient computing device, it is contemplated that system 100 may include additional sender computing devices and/or additional recipient computing devices. For example, multiple senders may be able to connect to a single recipient, such as, for example recipient computing device 150. Likewise, a single sender, such as, for example, sender computing device 110 may be configured to connect to multiple recipients. Additionally, the embodiments and functionalities described herein may operate via a multitude of computing systems including, without limitation, desktop computer systems, wired and wireless computing systems, mobile computing systems (e.g., mobile telephones, net-books, tablet or slate type computers, notebook computers, and laptop computers), hand-held devices, multiprocessor systems, microprocessor-based or programmable consumer electronics, minicomputers, and mainframe computers.

In certain embodiments, the sender computing device 110 may include a self-terminating messaging component 112 comprising a plurality of components, such as a condition generator 114, a content generator 116, a security context module 118, a security key generator 120, a security key association module 122 and an encryption module 124.

Content generator 116 may generate content including, but not limited to, email communications, email attachments, instant messages, instant message attachments, SMS communications, blog posts, messages published to bulletin boards and social media websites, and/or other forms of electronic communications. A content generator 116 may generate content which may include an identifier that the content or portions of the content may be self-terminating. Self-terminating messaging component 112, or components thereof, may also identify content or portions of the content as self-terminating. For example, after the user has generated an email message, the self-terminating messaging component 112 may analyze the recipient list and determine that a filter applies to one or more recipients. Based on that determination, the self-terminating messaging component 112 may then identify content or a portion of the content in the email addressed to the one or more filtered recipients as self-terminating.

Condition generator 114 may contain, receive, generate and/or associate conditions for which the electronic content will self-terminate. A condition defines the terms under which content may self-terminate. In embodiments, a condition may include user-specified events, such as the elapse of a time period, the access of the electronic content, the deletion of the electronic content, etc. In other embodiments, a condition may also include events that are not user-specified, such as the detection of a security threat by the sender computing device 110 or recipient computing device 150, determining an alteration to system architecture, etc.

Security context module 118 may determine the type or level of security to be applied to the electronic content. The determination may be based on the condition that condition generator 114 associates with the electronic content. In embodiments, security context complexity may be determined by the complexity of the condition associated with the electronic content. For example, security context complexity may be different for user-specified events conditions, time lapse conditions and/or electronic content access conditions. In such an example, the security context may be more complex for user-specified events conditions than for time lapse conditions. In embodiments, security context module 118 may contain or have access to a list or table of security levels and the conditions respectively associated with the security levels. After determining a security level to be applied to the electronic content, security context module 118 may access security key generator 120.

Security key generator 120 provides security keys as described in further detail in Security Measure for Exchanging Keys over Networks, Ser. No. 14/808,709, filed on Jul. 24, 2015, which is incorporated by reference in its entirety. In embodiments, security keys may be established prior to generating electronic content. In such embodiments, security keys may use encryption methods, such as One-Time Pad (OTP), and may be transmitted to one or more members of a peer-to-peer network prior to transmitting the electronic content to a recipient. The security context complexity may also be determined by the strength of the security key provided by security key generator 120 (e.g., a more complex security context may be applied to a stronger security key), the method of security key generation, the number of times the security may have been shared and the age of the security key.

In some embodiments, security key association module 122 may determine which security keys provided by security key generator 120 are associated with the determined security context. For example, a security key may be associated with electronic content based on factors, such as the content transmission method, the age of the security key, the type of network over which the electronic content may be transmitted, the type of computing devices involved in the transmission, and the probability of eavesdropping on the transmission. In such embodiments, security key association module 122 may contain or have access to a list or table of security contexts and the security keys respectively associated with the security contexts. Security key association module 122 may select a security key from the pool of available security keys for the determined security context. In embodiments, the selection process may be based on user selection or may be rule-based and may correspond to one or more security contexts.

In some embodiments, after a security key has been selected, encryption module 124 may be invoked. Encryption module 124 applies the selected security key to the electronic content, thereby encrypting the electronic content. One of skill in the art will appreciate that any type of key-based encryption and/or decryption algorithm may be employed without departing from the scope of this disclosure. In embodiments, the encrypted content, notification of the condition upon which the electronic content will self-terminate and/or notification of the security key and information associated with the security key may then be exchanged with one or more recipients.

In certain embodiments, encryption module 124 may alternately be invoked in response to sender initiating transmission of the electronic content, notification of the condition upon which the content will self-terminate and/or notification of the security key and information associated with the security key. After the electronic content has been encrypted, the encrypted content may be exchanged with a recipient computer, such as recipient computing device 150. In some embodiments, the encrypted content may be exchanged with the recipient computing device on the same network used to exchange the security key between the sender and recipient. For example, a key node may be responsible for generating and storing security keys. In embodiments, a key node may be physically or functionally located on one or more of the sender computing device and the recipient computing device. In alternate embodiments, a key node may be physically located on a separate computing device or functionally allocated between a plurality of separate computing devices. In still other embodiments, a key node may be functionally allocated between one or more of the sender computing device, the recipient computing device and one or more separate computing devices. Continuing with the example, the key node may be on a secured network and may exchange a security key with a sender and a recipient via the secured network. The sender and recipient may then exchange content via the secured network.

In other embodiments, the encrypted content may not be transmitted to the recipient computing device on the same network used to transfer the security key to and/or between the sender and recipient. For example, a key node may be on a secured network and may exchange a security key with a sender and a recipient via the secured network. The sender and recipient, in contrast, may exchange content via an unsecured network or via a separate secured network. Alternately, the key node may transfer a security key to a sender via an unsecured network and a recipient via a secured network. The sender and recipient may then exchange content via the unsecured network, the secured network, a separate unsecured network or a separate secured network. In another example, a security key may be exchanged between a sender and recipient via a peer-to-peer connection or via a point-to-point connection, whereas the encrypted content is transferred between the sender and recipient via a distributed computing network connection, such as an Internet connection. In such an example, the peer-to-peer connection or point-to-point connection may represent a closed, secured network and the Internet may represent an open, less secured network.

Continuing with FIG. 1, recipient computing device 150 may include a self-terminating messaging component 152 comprising a plurality of components, such as a security key association module 154, a condition evaluator 156 and a decryption module 158. The security key association module 154 associates the encrypted content with a corresponding security key. In embodiments, after receiving encrypted self-terminating content, security key association module 154 may parse the notification of the security key and information associated with the security key. The security key association module 154 may identify the security key referenced in the notification of the security key and information associated with the security key. The method of identifying the security keys may be user-based or rule-based and may include factors, such as content transmission method, the age of the security key, the type of network over which the content may be transmitted, the type of computing devices involved in the transmission, and the probability of eavesdropping on the transmission. The security key association module 154 may then access the identified security key.

The condition evaluator 156 evaluates whether the condition associated with the encrypted content has been satisfied. Condition evaluator 156 may parse the notification of the condition upon which the content will self-terminate. After determining the condition associated with the encrypted content, the condition evaluator 156 may determine whether the condition has been satisfied. In embodiments, conditions may include the elapse of a time period, the access of the electronic content, the deletion of the electronic content, the detection of a security threat by the sender computing device 110 or recipient computing device 150, determining an alteration to system architecture, etc. If the condition has been satisfied, the security key associated with the encrypted content is deleted and the encrypted content may be rendered unreadable.

If the condition has not been satisfied, decryption module 158 is invoked. Decryption module 158 decrypts the encrypted content using the identified security key. In embodiments, decryption module 158 may apply the selected security key to the encrypted content, thereby decrypting the content. One of skill in the art will appreciate that any type of key-based encryption and/or decryption algorithm may be employed without departing from the scope of this disclosure.

Figure 2:
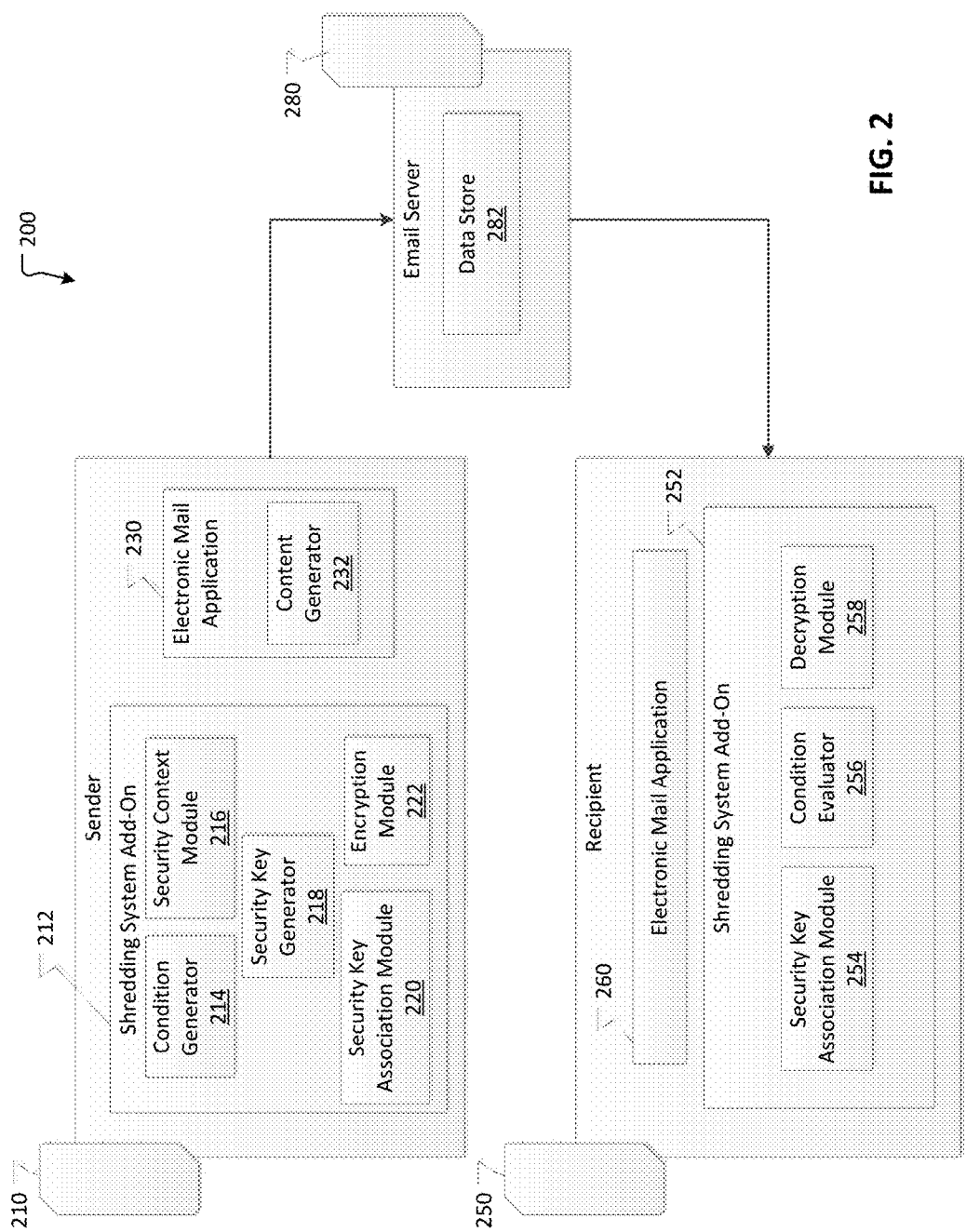
FIG. 2 illustrates a system for exchanging self-terminating email and email document attachments according to one or more embodiments of the present disclosure.

FIG. 2 illustrates an exemplary system 200 for exchanging self-terminating email content. As shown in FIG. 2, the system 200 may include a sender computing device 210, a recipient computing device 250 and an email server 280. In certain embodiments, the sender computing device 210 and the email server 280 may establish a communication session with each other over the Internet or via some other form of communication. Similarly, the email server 280 and the recipient computing device 250 may establish a communication session with each other over the Internet or via some other form of communication. The communication sessions may be secured or unsecured connections.

With respect to the general functionality of the components of FIG. 2, the above discussion of FIG. 1 largely describes the functionality of condition generator 214, security context module 216, security key generator 218, security key association module 220, encryption module 222, security key association module 254, condition evaluator 256 and decryption module 258. With this in mind, in embodiments, the sender computing device 210 may include an electronic mail application 230 and a shredding system add-on 212. The electronic mail application 230 may comprise a content generator 232 and may be capable of sending and receiving generated email content. The shredding system add-on 212 may comprise a plurality of components, such as a condition generator 232, a security context module 216, a security key generator 218, a security key association module 220 and an encryption module 222. Although the above configuration of components is specified, it is to be understood that one or more components in the sender computing device 210 may be alternately configured. For example, the condition generator 214 may alternately be located within the electronic mail application 230. Further, although the shredding system add-on 212 is presented as an add-on to the electronic mail application 23, the shredding system 212 may alternately be presented as a stand-alone application on sender computing device 210, or as a stand-alone application on a remote computing device (not pictured).

The content generator 232 may identify the email content or portions of the email content as self-terminating. In embodiments, the identification of self-terminating content may be based upon input received from a user or other application identifying the self-terminating content. In further embodiments, the self-terminating content may be identified based upon message content, the intended recipients, etc. In still further embodiments, the elf-terminating content may be identified according to one or more pre-defined rules. Similarly to the self-terminating messaging component 112 discussed with respect to FIG. 1 above, the electronic mail application 230, or additional components thereof (not pictured), may also identify email content or portions of the email content as self-terminating. After the appropriate security key has been selected for the condition associated with the email content (as discussed above with respect to FIG. 1), a notification of the security key, a notification of the information associated with the security key and a notification of the condition upon which the email content will self-terminate may be included in the metadata associated with the email content. In embodiments, the metadata may be included in the email header, the email body or in an email attachment. In certain embodiments, the email content and/or associated metadata are then encrypted by the encryption module 222.

After encrypting the email content and associated metadata, the encrypted email content and associated metadata are sent to an email server 280. In some embodiments, email server 280 is a third party server configured to transmit email communications between a sender and a recipient. Email server 280 may comprise one or more communication modules (not pictured) and a data store 282. Similarly to the self-terminating messaging component discussed above with respect to general purpose inter-network mail routing facilities, no changes to email server 280 are necessary for embodiments disclosed herein. The data store 282 may be used to store encrypted content received from sender computing device 250. In embodiments, email server 280 determines that the encrypted email content and associated metadata are to be delivered to a recipient and transmits the encrypted email content and associated metadata to recipient computing device 250.

Recipient computing device 250 may include an electronic mail application 260 and a shredding system add-on 252. The shredding system add-on 252 may comprise a plurality of components, such as a security key association module 254, a condition evaluator 256 and a decryption module 258. In certain embodiments, the shredding system 252 may be represented as a stand-alone program and/or may be an add-on to electronic email application 230.

In embodiments, when encrypted email content and associated metadata is received by recipient computing device 250 using the electronic mail application 260, security key association module 254 may parse the metadata to ascertain the notification of the security key and the notification of information associated with the security key. In such embodiments, parsing the metadata may comprise analyzing the email header, the email body and any attachments. Parsing the metadata may involve the use of a parsing application (not pictured) located within security key association module 254, electronic mail application 260 or elsewhere within recipient computing device 250. When a recipient attempts to access (e.g., read, forward, delete, etc.) the encrypted email content, the condition evaluator 256 may be invoked. If the condition evaluated by the condition evaluator 256 has been satisfied, the security key associated with the encrypted mail content may be deleted or otherwise become inaccessible, rendering the encrypted mail content unreadable. If the condition has not been satisfied, decryption module 258 is invoked. Decryption module 258 decrypts the encrypted email content using the identified security key, rendering the email content readable.

Figure 3:
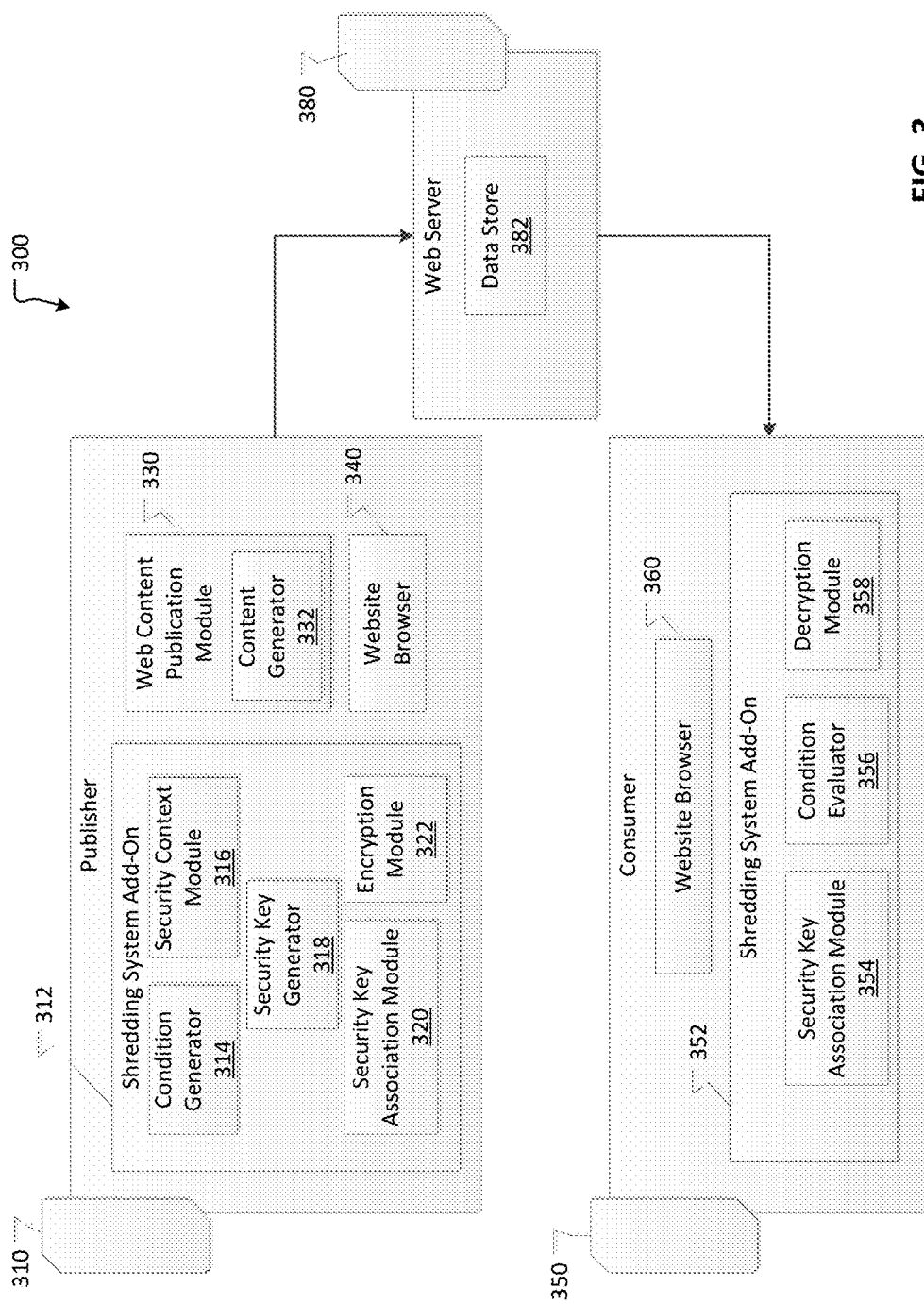
FIG. 3 illustrates a system for publishing self-terminating web communication content according to one or more embodiments of the present disclosure.

FIG. 3 illustrates a system 300 for exchanging self-terminating web communication messages. As shown in FIG. 3, the system 300 may include a publisher computing device 310, a consumer computing device 312 and a web server 380. In certain embodiments, the publisher computing device 310 and the web server 380 may establish a communication session with each other over the Internet or via some other form of communication. Similarly, the web server 380 and the consumer computing device 350 may establish a communication session with each other over the Internet or via some other form of communication. The communication sessions may be secured or unsecured connections.

With respect to the general functionality of the components of FIG. 3, the above discussion of FIG. 1 largely describes the functionality of condition generator 314, security context module 316, security key generator 318, security key association module 320, encryption module 322, security key association module 354, condition evaluator 356 and decryption module 358. With this in mind, in certain embodiments, the publisher computing device 310 may include a web content publication module 330, a website browser 340 and a shredding system add-on 312. Web content publication module 330 may comprise a content generator and may be capable of publishing generated web content to one or more web servers 380. In certain embodiments, web content is published over standardized World Wide Web protocols (e.g., HTTP, HTTPS, etc.). Web content publication module 330 may be accessed with website browser 340 or Web content publication module may be accessible directly by publisher computing device 310. Website browse 340 may be any browser capable of rendering website content to a viewer, such as Internet Explorer and the like. The shredding system add-on 312 may comprise a plurality of components, such as a condition generator 314, a security context module 316, a security key generator 318, a security key association module 320 and an encryption module 322.

For example, the content generator 332 may provide an indication that the web content or portions of the web content may be self-terminating. A sender using content generator 332 to generate web content may identify the web content or portions of the web content as self-terminating. Similarly to the self-terminating messaging component 112 discussed with respect to FIG. 1 above, the web content publication module 330, or additional components thereof (not pictured), may also identify web content or portions of the web content as self-terminating. After the appropriate security key has been selected for the condition associated with the web content (as discussed above with respect to FIG. 1), an indication of the security key, an indication of the information associated with the security key and an indication of the condition upon which the web content will self-terminate may be included in the web content. In certain embodiments, the above indications may be represented by a bit sequence appended to the web content. The web content and/or associated indicators may then be encrypted by the encryption module 322.

After encrypting the web content and/or any associated indicators, the encrypted web content and associated indicators are published to a web server 380. As referred herein, web server 380 may be a third party server configured to receive, store or display web content published by a publisher, such as Facebook, Twitter, etc. Web server 380 may comprise one or more communication modules (not pictured) and a data store 382. The data store 382 may be used to store encrypted content published from publisher computing device 310.

Consumer computing device 350 may include a website browser 360 and a shredding system add-on 352. The website browser 360 may be capable of accessing the encrypted content on the web server 380. The shredding system add-on 352 may comprise a plurality of components, such as a security key association module 354, a condition evaluator 356 and a decryption module 358. In certain embodiments, the shredding system 352 may be represented as a stand-alone program or the like.

In embodiments, when a recipient attempts to access (e.g., read, forward, delete, etc.) the encrypted web content, security key association module 354 may parse the encrypted web content to determine whether an indication of the security key or an indication of information associated with the security key is present. If it is determined that an indication is present, the condition evaluator 356 may be invoked. If the condition evaluated by the condition evaluator 356 has been satisfied, the security key associated with the encrypted web content may be deleted or otherwise made inaccessible and the encrypted web content may be rendered unreadable. If the condition has not been satisfied, decryption module 358 may be invoked. Decryption module 358 may decrypt the encrypted web content using the identified security key, rendering the web content readable.

Figure 4:
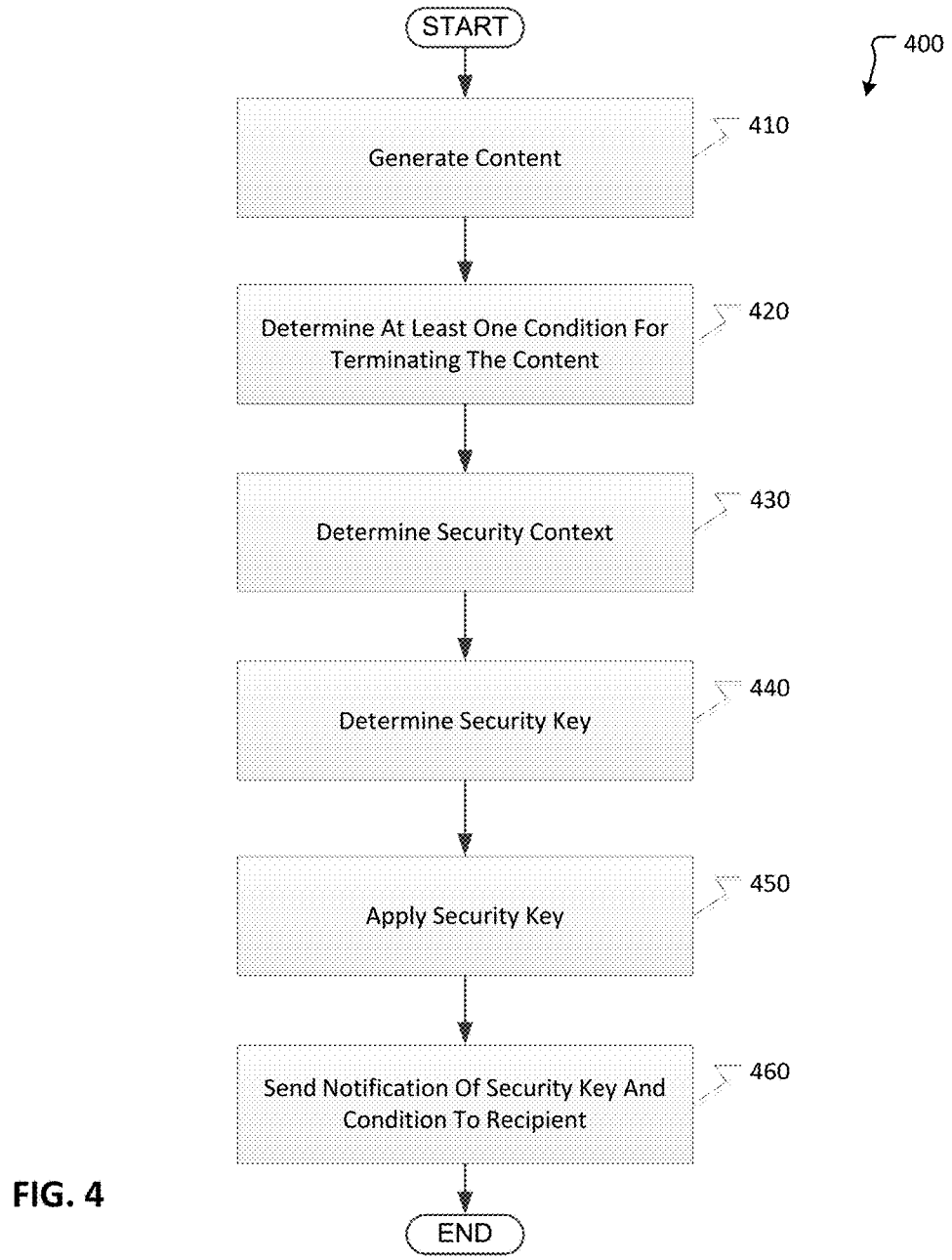
FIG. 4 illustrates a method for sending self-terminating electronic content over a peer-to-peer network according to one or more embodiments of the present disclosure.

FIG. 4 is a flowchart of a method 400 for sending self-terminating electronic content over a peer-to-peer network. Method 400 may be executed, for instance, by sender computing device 110, described above. Method 400 may alternatively be executed by any suitable computing device capable of sending self-terminating electronic content over a peer-to-peer network. The method 400 may be implemented in software, hardware or a combination of software and hardware. At operation 410, electronic content may be generated by sender computing device 110. Electronic content may include email communications, email attachments, instant messages, instant message attachments, SMS communications, blog posts, messages published to bulletin boards and social media websites, and any other type of electronic file. In embodiments, electronic content may be generated by a component of self-terminating messaging component, such as content generator 116 of FIG. 1. In alternate embodiments, content generator may be part of another type of application, a stand-alone application and/or implemented on an alternate computing device. At operation 420, at least one condition for terminating the electronic content may be determined by condition generator 114. In certain embodiments, conditions for termination may be specified at least in part by the user of the sender computing device 110. Such conditions may be rule-based, based on user activity or based on content. Such conditions may also include the elapse of a time period, accessing the electronic content or the occurrence of some other user-triggered event. In other embodiments, conditions for termination may be specified at least in part by the self-terminating messaging component 112.

At operation 430 a security context may be determined. A security context may define a security level, a security type and/or a method of security. The method 400 may determine a security context based on the condition associated with the electronic content. For example, a security context of 'High' may be associated with a condition of 'Time Elapse=1 day', whereas a security context of 'Tow' may be associated with a condition of 'Time Elapse=90 days'. While specific examples are provided, one of skill in the art will appreciate that the security context may be determined using alternate methods. For example, the level of security may be based on the message type, message context, the identity of a sender, the identity of a recipient, etc. At operation 440, a determination may be made as to a security key that is associated with the determined security context. Operation 440 may include accessing a list of one or more security keys. In embodiments, the security keys may be arranged in accordance with their associated security contexts, so that selecting a security key involves selecting the security key from an identified group of security keys. In other embodiments the security key may be determined based upon receiving user input identifying a security. In other embodiments, the security key may be determined using a predefined rule, based on message content, identity of the recipient, type of network used to transmit the message content, etc. At operation 450, the selected security key is applied to the electronic content using encryption module 124, thereby encrypting the electronic content. In embodiments, the encrypted method is One-Time Pad (OTP) encryption, in which security keys may be previously exchanged between communicating clients. In other embodiments, the electronic content may be encrypted using any encryption method known to one skilled in the art. At operation 460, the sender computing device 110 may send one or more notifications of the selected security key, one or more notifications of information associated with the selected security key and a notification of the condition upon which the electronic content is to self-terminate to the client. The notification may be sent as part of the electronic content or separately from the electronic content.

Figure 5:
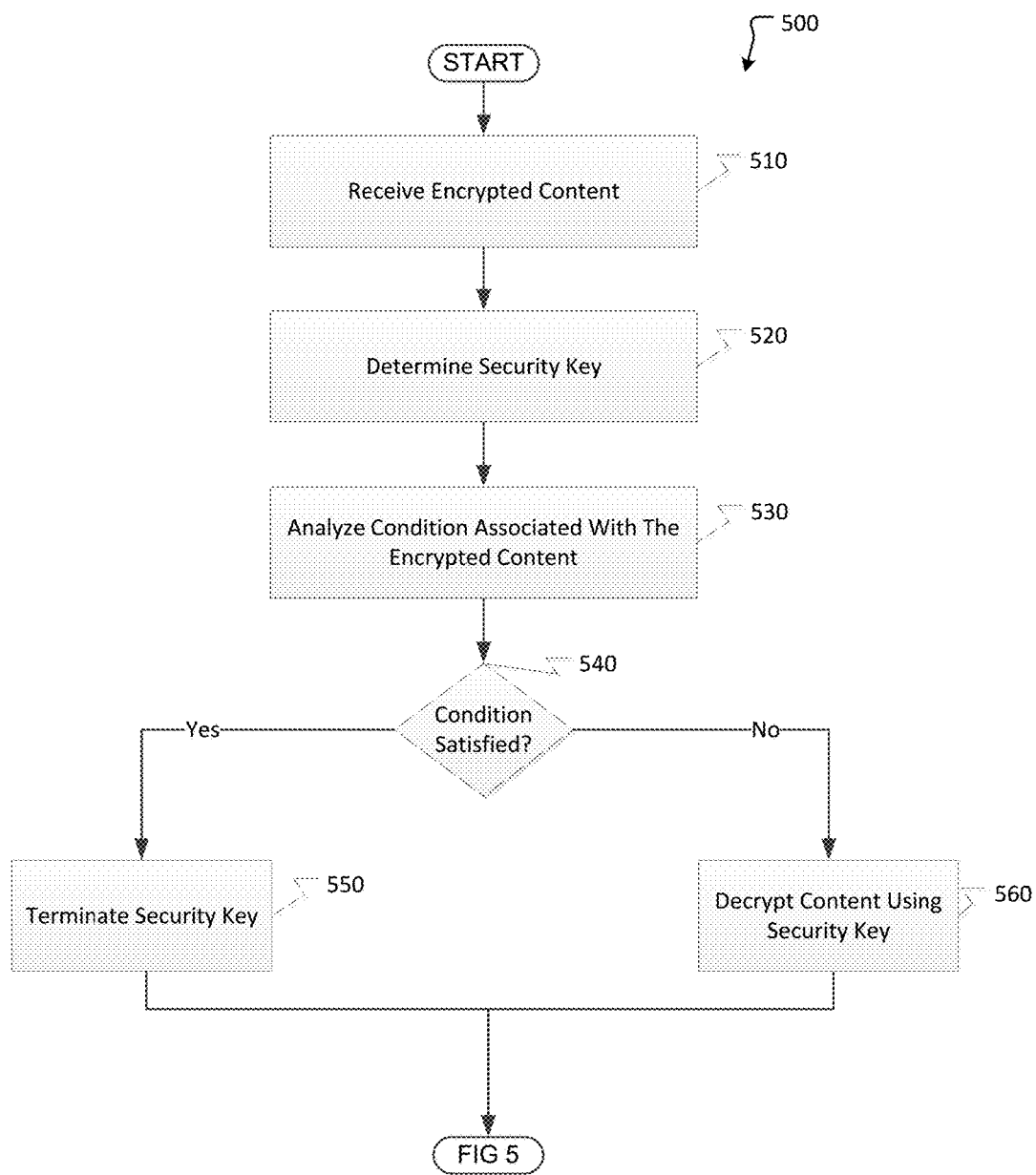
FIG. 5 illustrates a method for receiving self-terminating electronic content over a peer-to-peer network according to one or more embodiments of the present disclosure.

FIG. 5 is a flowchart of a method 500 for receiving self-terminating electronic content over a peer-to-peer network. Method 500 may be implemented using software, hardware or a combination of software and hardware. Method 500 may alternatively be executed by any suitable computing device capable of receiving self-terminating electronic content over a peer-to-peer network. At operation 510, encrypted electronic content, one or more notifications of the security key used to encrypt the electronic content, one or more notifications of information associated with the security key, and/or one or more notifications of the condition upon which the electronic content will self-terminate may be received. The received message may be parsed to identify the one or more notifications included with the email message. At operation 520, the security key corresponding to the security key that was used to encrypt the electronic content is determined. The determination may be made in part by analyzing the information parsed from the notifications. At operation 530, the condition associated with the encrypted electronic content is determined. The determination may be made in part by analyzing the information parsed from the notifications. The analysis may be performed by a component of self-terminating messaging component 152, such as condition evaluator 156.

At operation 540, a determination may be made as to whether the condition associated with the encrypted electronic content is satisfied. If it is determined that the condition has been satisfied, the flow branches to operation 550. At operation 550, the security key corresponding to the security key that was used to encrypt the electronic content may be deleted. In certain embodiments, deleting the security key may involve removing the security key from one or more computing devices or disabling the security key on one or more computing devices. Disabling the security key, for example, may include moving the security key to a 'Used Keys' folder, re-associating the key with a 'NULL' security context or commenting out the security key in the security key pool discussed above. After deleting the security key, the encrypted content may be rendered inaccessible by the recipient. In some embodiments, rendering the encrypted content inaccessible may involve permanently removing access to the encrypted content for both sender and recipient. In some embodiments, rendering the encrypted content inaccessible may involve deleting the encrypted content from one or more of the sender computing devices and the recipient computing devices. If it is determined that the condition has not been satisfied, the flow branches to operation 560. At operation 560, the security key corresponding to the security key that was used to encrypt the electronic content may be applied to the electronic content, thereby decrypting the electronic content. In certain embodiments, decrypting the electronic content may render the electronic content accessible, readable or executable.

Figure 6:
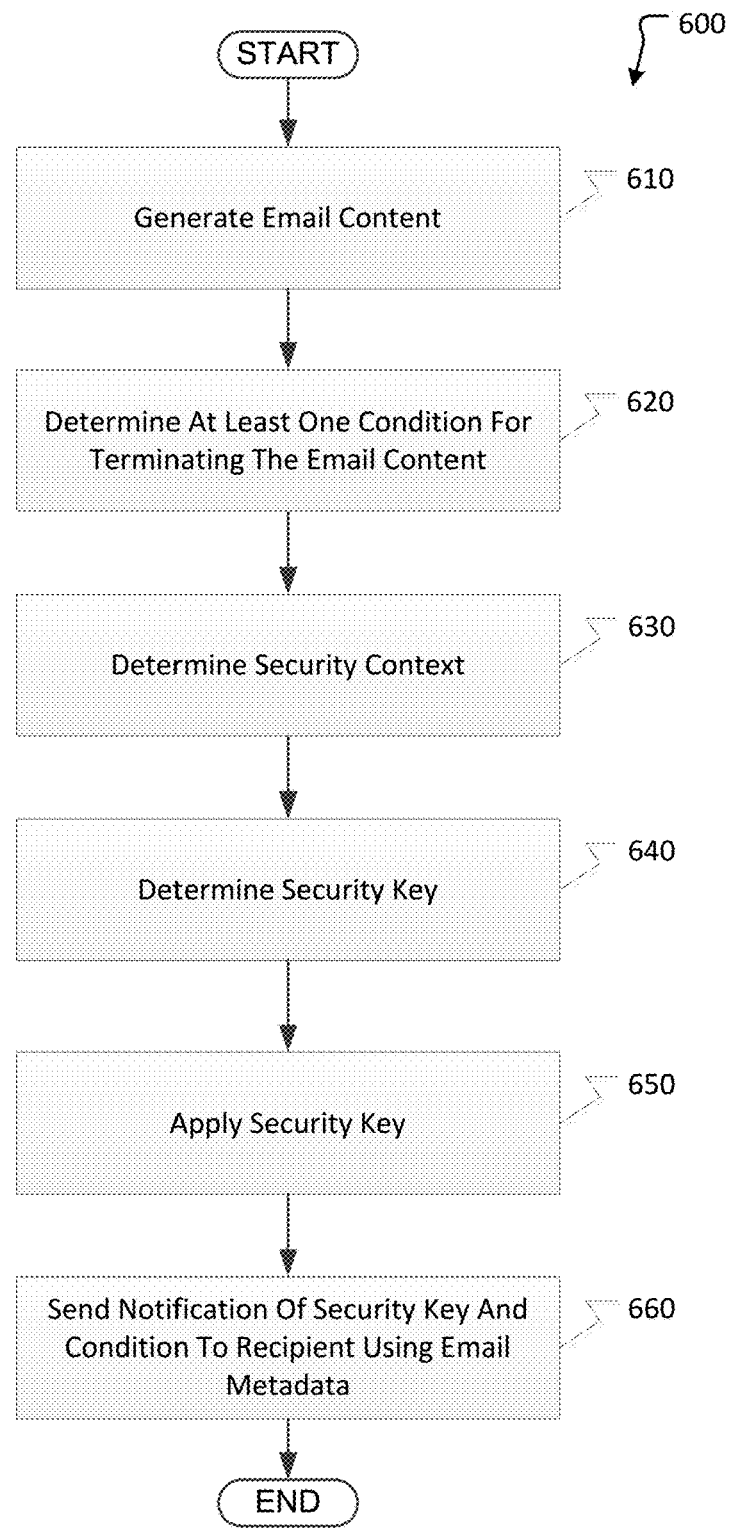
FIG. 6 illustrates a method for sending self-terminating email content according to one or more embodiments of the present disclosure.

FIG. 6 is a method 600 for sending self-terminating email content. Method 600 may be implemented using software, hardware or a combination of software and hardware. Method 600 may be executed, for instance, by sender computing device 210, described above. Method 600 may alternatively be executed by any suitable computing device capable of sending self-terminating email content over a network such as the Internet or via some other form of communication. At operation 610, email content may be generated by sender computing device 210. Email content may include, but is not limited to, emails, email document attachments and/or email metadata. In embodiments, email content may be generated by a component of electronic mail application 230 or by an add-on to the electronic mail application. At operation 620, at least one condition for terminating the email content may be determined. In certain embodiments, conditions for termination may be specified at least in part by the user of the sender computing device, as described above with respect to FIG. 4.

At operation 630 a security context may be determined. The security context module 216 may determine a security context based on the condition associated with the email content, as described above with respect to FIG. 4. At operation 640, a determination may be made as to a security key that is associated with the determined security context. Although the varying considerations of operation 640 are described above with respect to FIG. 4, further considerations may include the recipient, the priority of the message, the presence of an email attachment, massage content and/or email application-based rules. At operation 650, the selected security key is applied to the email content using encryption module 222 of shredding system add-on, thereby encrypting the email content. Encrypting the email content may include adding content to the email header, email body and/or an email attachment. In embodiments, any encryption method known to one skilled in the art may be used to encrypt the email content. At operation 660, the sender computing device 210 may embed or append into the encrypted email content any of a notification of the selected security key, a notification of information associated with the selected security key and/or a notification of the condition upon which the email content is to self-terminate. In certain embodiments, the notifications may also be encrypted and/or may be embedded or added to the metadata associated with the email content. Such metadata may be associated with the email header, email body and/or an email attachment. In certain embodiments, the email message is transmitted using a messaging architecture, such as MAPI, or messaging a protocol, such as IMAP or POP.

Figure 7:
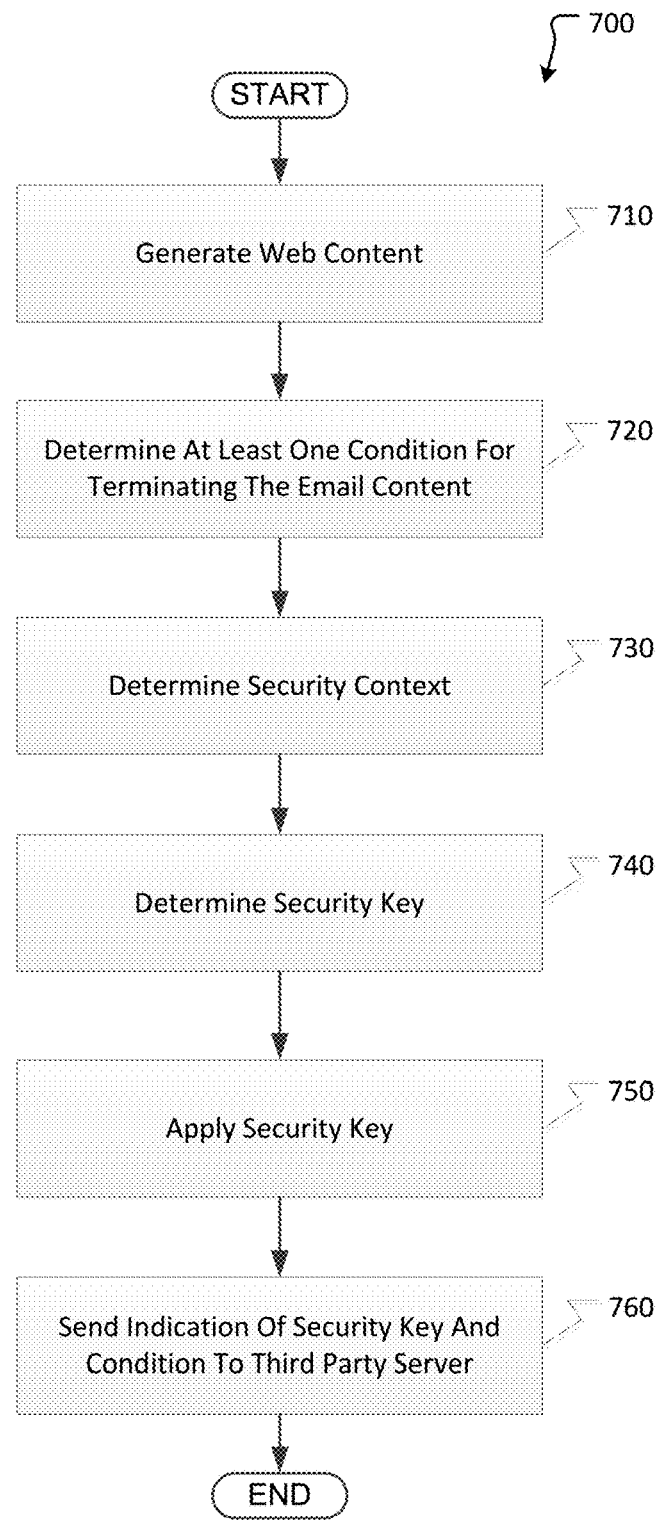
FIG. 7 illustrates a method for publishing self-terminating web content according to one or more embodiments of the present disclosure.

FIG. 7 is a method 700 for publishing self-terminating web content. Method 700 may be implemented using software, hardware or a combination of software and hardware. Method 700 may be executed, for instance, by a publisher computing device, described above. Method 700 may be executed by any suitable computing device capable of publishing self-terminating web content over a network such as the Internet or via some other form of communication. At operation 710, web content may be generated by publisher computing device 310. Web content may include, but is not limited to, messages published to social media websites, messages published to web servers, blog posts, and messages published to media outlets. At operation 720, at least one condition for terminating the web content may be determined. In certain embodiments, conditions for termination may be specified at least in part by the user of the publisher computing device 310, by web content publication module 330 or by website browser 340, as described above with respect to FIG. 4. Additional conditions may include the webpage/website to which the web content is posted becomes unreachable or the web content is blocked by a website moderator.

At operation 730 a security context may be determined. The security context may be based on the condition associated with the web content, as for example, described above with respect to FIG. 4. At operation 740, a determination may be made as to a security key that is associated with the determined security context. Although the varying considerations of operation 740 are described above with respect to FIG. 4, further considerations may include the security level of the website/webpage to which the web content is posted, the website/webpage address or the web browser used to access the web content. At operation 750, the selected security key is applied to the web content, thereby encrypting the web content. Encrypting the web content may include altering or adding content to the message header or message body prior to posting the message to the web server. In embodiments, any encryption method known to one skilled in the art may be used to encrypt the web content. At operation 760, the method 700 may embed or append into the encrypted web content an indication of the selected security key, an indication of information associated with the selected security key and/or an indication of the condition upon which the web content is to self-terminate. This information may be represented in the web content as a sequence of bits at or near the beginning of the message. or may be otherwise identified in the POST statement In certain embodiments, the indications may also be encrypted using the encryption module 322. The web content may be transmitted over a standardized web protocol, such as HTTP or HTTPS.

Figure 8:
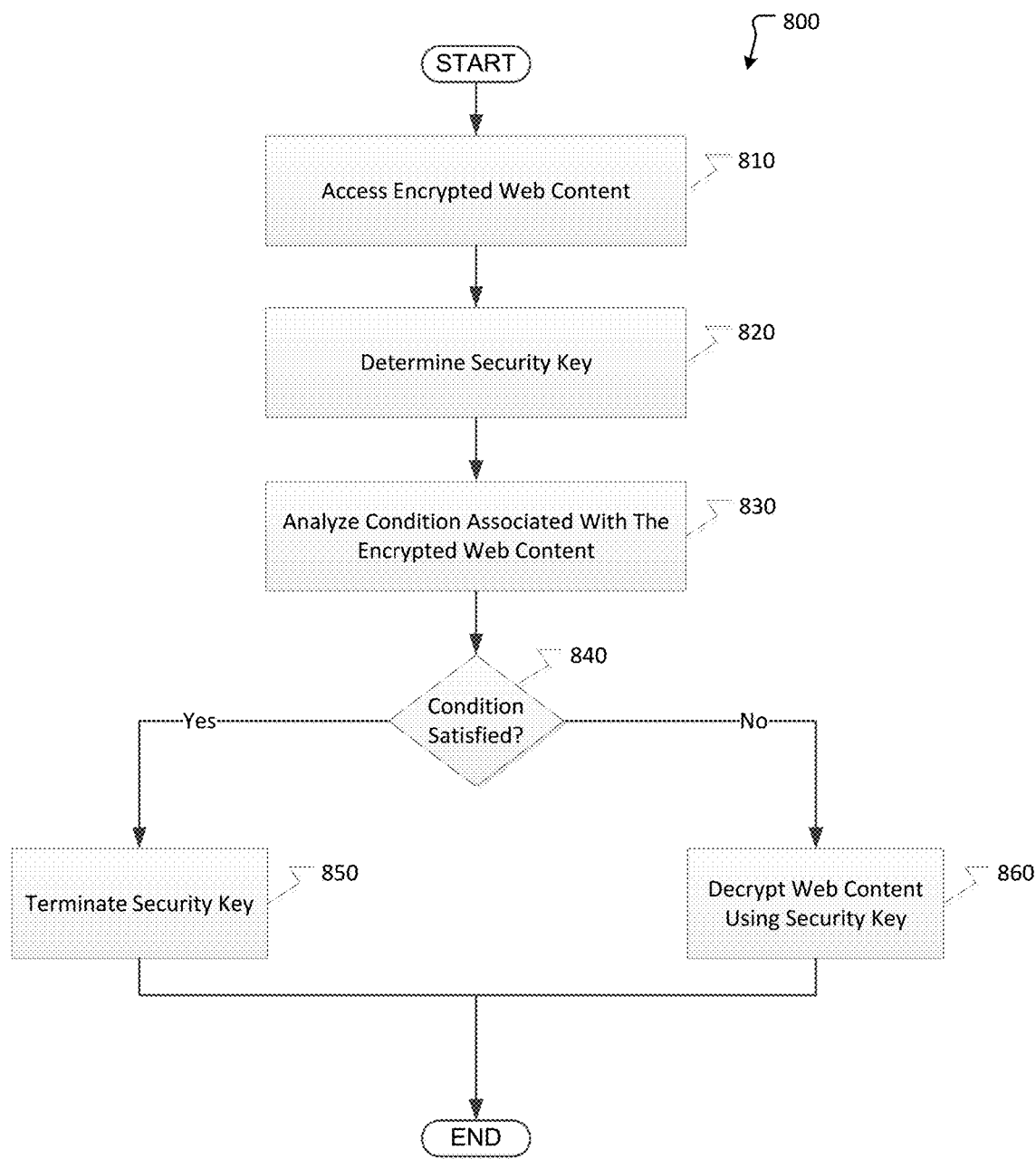
FIG. 8 is an embodiment of a method for accessing self-terminating web content.

FIG. 8 is a method 800 for accessing self-terminating web content. Method 800 may be implemented using software, hardware or a combination of software and hardware. Method 800 may be executed, for instance, by a consumer computing device, described above. Method 800 may be executed by any suitable computing device capable of accessing self-terminating web content over a network such as the Internet or a similar network. At operation 810, encrypted web content may be accessed on web server. In certain embodiments, the encrypted web content may be accessed via web browser, which may have shredding system add-on installed therein. In embodiments, upon accessing the web server, the encrypted content may be analyzed to identify one or more notifications. In some embodiments, the encrypted web content may comprise at least bit sequence, as discussed in FIG. 3. The bit sequence may provide an indication that the encrypted web content is encrypted. The bit sequence may also provide any of an indication of the security key, an indication of the information associated with the security key or an indication of the condition upon which the web content will self-terminate. In alternate embodiments, the indications discussed above may be present in encrypted web content although a bit sequence is not provided.

At operation 820, the security key corresponding to the security key that was used to encrypt the web content is determined. The determination may be made in part by analyzing the one or more indications provided in the encrypted web content. The analysis may include parsing the one or more indications. The parsing may include the use of a parsing application installed within the web browser or elsewhere within the publisher computing device. The parsing application may analyze the encrypted web content for predefined patterns and/or executable scripts. In some embodiments, one or more executable scripts may extract and format the one or more indications. At operation 830, the condition associated with the encrypted web content may be determined. The determination may be made in part by analyzing the information provided in the encrypted web content. At operation 840, a determination may be made as to whether the condition associated with the encrypted web content is satisfied. The determination may include considerations such as the IP address from which the request to access the web content originated, whether the webpage/ website to which the web content is posted becomes unreachable or the web content is blocked by a website moderator If it is determined that the condition has been satisfied, the flow proceeds to operation 850.

At operation 850, the security key corresponding to the security key that was used to encrypt the web content may be deleted, as discussed above with respect to FIG. 5. If it is determined that the condition has not been satisfied, the flow proceeds to operation 560. At operation 560, the security key corresponding to the security key that was used to encrypt the web content may be transmitted to a web server via a website browser. In embodiments, web server may validate the security key and transmit (e.g., upload) the encrypted web content. Upon receipt of the encrypted web content, the security key may be applied to the encrypted web content, thereby decrypting the web content. In other embodiments, web server may validate the security key and may perform the decryption process locally. For example, the web server may be capable of applying the received security key to the encrypted web content, thereby decrypting the content. The decrypted web content may then be viewed by a consumer via website browser or uploaded to consumer computing device. In an alternate embodiment, web server may not validate the security key, prior to uploading and/or presenting the encrypted content to consumer computing device 350. In still other embodiments, website browser may apply the security key to the encrypted web content to perform encryption. For example, the decryption may be invoked by a bit sequence included in the encrypted web content, as discussed above. The security key may be applied directly to the web content presented in web browser 360 in order to alter (e.g., decrypt) the web browsers 360 content, but not alter the content on the web server.

FIG. 5 and the additional discussion in the present specification are intended to provide a brief general description of a suitable computing environment in which the present disclosure and/or portions thereof may be implemented. Although not required, the embodiments described herein may be implemented as computer-executable instructions, such as by program modules, being executed by a computer, such as a client workstation or a server. Generally, program modules include routines, programs, objects, components, data structures and the like that perform particular tasks or implement particular abstract data types. Moreover, it should be appreciated that the disclosure and/or portions thereof may be practiced with other computer system configurations, including hand-held devices, multi-processor systems, microprocessor-based or programmable consumer electronics, network PCs, minicomputers, mainframe computers and the like. The disclosure may also be practiced in distributed computing environments where tasks are performed by remote processing devices that are linked through a communications network. In a distributed computing environment, program modules may be located in both local and remote memory storage devices.

Figure 9:
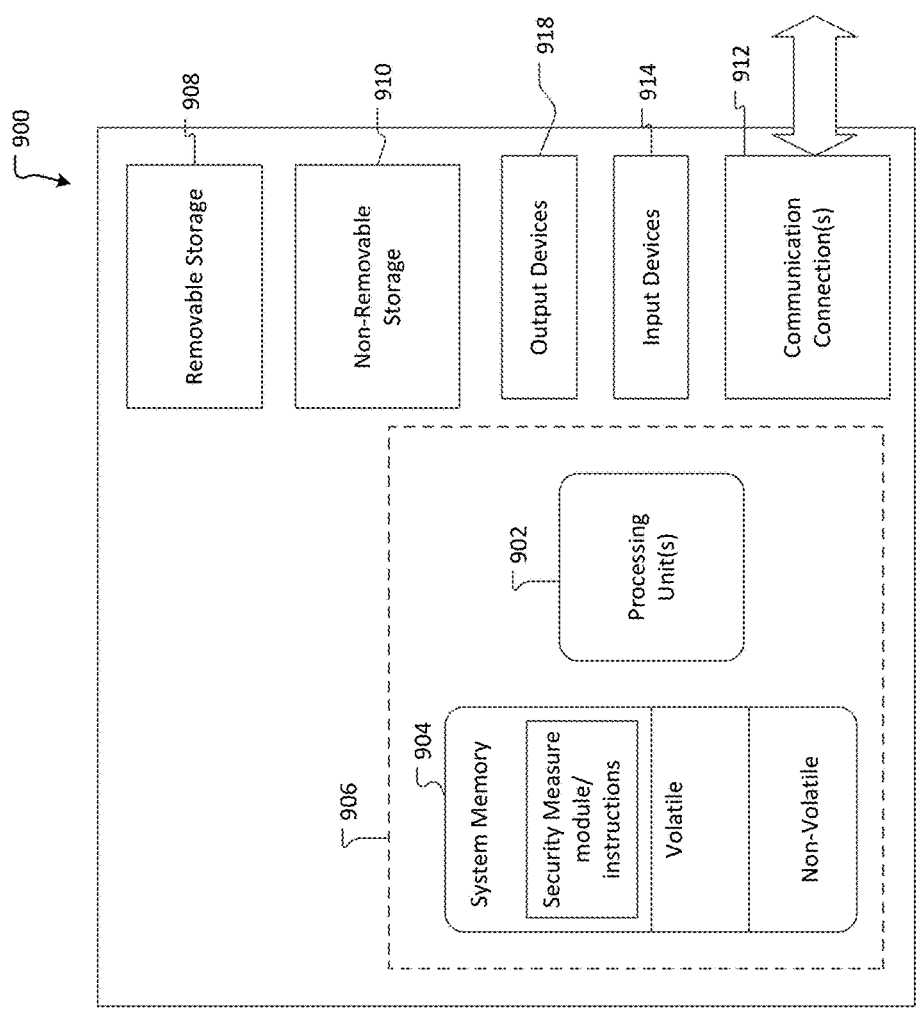
FIG. 9 illustrates one example of a suitable computing environment in which one or more of the embodiments of the present disclosure may be implemented.

FIG. 9 illustrates one example of a suitable operating environment 900 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 900 typically includes at least one processing unit 902 and memory 904. Depending on the exact configuration and type of computing device, memory 904 (storing, among other things, security measure component(s) and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 9 by dashed line 906. Further, environment 900 may also include storage devices (removable, 908, and/or non-removable, 910) including, but not limited to, magnetic or optical disks or tape. Similarly, environment 900 may also have input device(s) 914 such as keyboard, mouse, pen, voice input, etc. and/or output device(s) 916 such as a display, speakers, printer, etc. Also included in the environment may be one or more communication connections, 912, such as LAN, WAN, point to point, etc.

Operating environment 900 typically includes at least some form of computer readable media. Computer readable media can be any available media that can be accessed by processing unit 902 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 900 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Embodiments of the present disclosure are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments and/or features or details provided in this application are not intended to limit or restrict the scope of the present disclosure as claimed in any way. The embodiments, examples, and details provided in this application are considered sufficient to convey possession and enable others to make and use the best mode of the claimed embodiments. The claimed embodiments should not be construed as being limited to any embodiment, example, or detail provided in this application. Regardless of whether shown and described in combination or separately, the various features (both structural and methodological) are intended to be selectively included or omitted to produce an embodiment with a particular set of features. Furthermore, embodiments according to the present disclosure may combine elements or components that are disclosed in general but not expressly exemplified in combination unless otherwise stated herein. It is therefore intended to cover in the appended claims all such changes and modifications that are within the scope of the invention. As such, having been provided with the description and illustration of the present application, one skilled in the art may envision variations, modifications, and alternate embodiments falling within the spirit of the broader aspects of the general inventive concept embodied in this application that do not depart from the broader scope of the claimed embodiments.

What is claimed is:

1. A system comprising:
at least one processor; and
memory coupled to the at least one processor, the memory comprising computer executable instructions that, when executed by the at least one processor, performs a method of sending self-terminating content, the method comprising:
generating content;
in response to generating the content, determining a condition for terminating the content;
determining a security context, wherein the determination of the security context is based at least in part on the condition;
based on the security context, determining a security key to associate with the content;
applying the security key to the content using One-Time Pad (OTP) encryption to generate encrypted content;
sending to a recipient computing device the encrypted content, a notification of the security key and a notification of the condition, wherein the encrypted content sent to the recipient computing device self-terminates upon satisfaction of the condition, and
wherein the security key is accessible to a sender computing device sending the content and the recipient computing device prior to sending the self-terminating content.

2. The system of claim 1, wherein generating content further comprises identifying one or more sections of the content as self-terminating.

3. The system of claim 2, wherein the one or more sections of the content comprise at least one of text, an image, and an audio file.

4. The system of claim 1, wherein the condition comprises at least one of an elapse of a time period, an access of the content, an activation of the content, a recipient-triggered event and an event triggered by a sender of the content.

5. The system of claim 1, wherein using the OTP encryption further comprises transmitting the security key in a point-to-point transmission.

6. The system of claim 1, wherein the notification of the security key and the notification of the condition are sent to the recipient over a peer-to-peer network.

7. A system comprising:
at least one processor; and
memory coupled to the at least one processor, the memory comprising computer executable instructions that, when executed by the at least one processor, performs a method of receiving self-terminating content, the method comprising:
receiving, by a computing device, encrypted content;
in response to receiving the encrypted content, determining a condition for terminating the encrypted content;
determining a security key to decrypt the encrypted content using One-Time Pad (OTP) encryption;
determining whether the condition has been satisfied, wherein self-termination of the content on the computing device is based upon the satisfaction of the condition, and wherein the security key is accessible to a sender computing device sending the content and the recipient computing device prior to sending the self-terminating content;
when the condition has been satisfied, deleting the security key; and
when the condition has not been satisfied, decrypting the encrypted content with the security key.

8. The system of claim 7, wherein the encrypted content comprises at least one of:
the self-terminating content;
a notification of the security key associated with the encrypted content; and
a notification of the condition associated with the encrypted content.

9. The system of claim 8, wherein determining the security key comprises parsing the notification of the security key.

10. The system of claim 8, wherein determining whether the condition has been satisfied comprises parsing the notification of the condition associated with the self-terminating content.

11. The system of claim 7, wherein deleting the security key comprises removing the security key from at least one of a computing device used to send the encrypted content and a computing device used to receive of the encrypted content.

12. The system of claim 7, wherein deleting the security key comprises disabling the security key on at least one of the computing device used to send the encrypted content and a computing device used to receive of the encrypted content.

13. The system of claim 7, wherein receiving the encrypted content comprises receiving the encrypted content over a peer-to-peer connection.

14. A system comprising:
at least one processor; and
memory coupled to the at least one processor, the memory comprising computer executable instructions that, when executed by the at least one processor, performs a method of receiving self-terminating content, the method comprising:
receiving, by a computing device, encrypted content;

in response to receiving the encrypted content, determining a condition for terminating the encrypted content;

determining a security key to decrypt the encrypted content using One-Time Pad (OTP) encryption;

determining whether the condition has been satisfied, wherein self-termination of the content on the computing device is based upon the satisfaction of the condition, and wherein the security key is accessible to a sender computing device sending teethe content and the recipient computing device prior to sending the self-terminating content;

when the condition has been satisfied, deleting the security key; and when the condition has not been satisfied, decrypting the encrypted content with the security key.

15. The computer-readable storage device of claim 14, wherein generating content further comprises identifying one or more sections of the content as self-terminating.

16. The computer-readable storage device of claim 15, wherein the one or more sections of the content comprise at least one of:
text;
an image; and
an audio file.

17. The computer-readable storage device of claim 14, wherein the condition comprises at least one of:
elapsing a time period;
accessing of the content;
activation of the content;
a recipient-triggered event; and
an event triggered by a sender of the content.

* * * * *